United States Patent
Atungsiri et al.

(10) Patent No.: US 12,463,855 B2
(45) Date of Patent: Nov. 4, 2025

(54) COMMUNICATIONS DEVICES, INFRASTRUCTURE EQUIPMENT AND METHODS

(71) Applicant: Sony Group Corporation, Tokyo (JP)

(72) Inventors: Samuel Asangbeng Atungsiri, Basingstoke (GB); Martin Warwick Beale, Basingstoke (GB); Kazuyuki Shimezawa, Basingstoke (GB); Vivek Sharma, Basingstoke (GB); Shin Horng Wong, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 857 days.

(21) Appl. No.: 17/772,154

(22) PCT Filed: Nov. 2, 2020

(86) PCT No.: PCT/EP2020/080648
§ 371 (c)(1),
(2) Date: Apr. 27, 2022

(87) PCT Pub. No.: WO2021/094119
PCT Pub. Date: May 20, 2021

(65) Prior Publication Data
US 2022/0385516 A1     Dec. 1, 2022

(30) Foreign Application Priority Data
Nov. 15, 2019   (EP) ..................... 19209541

(51) Int. Cl.
*H04L 27/26*   (2006.01)
*H04L 1/00*    (2006.01)
*H04L 5/00*    (2006.01)

(52) U.S. Cl.
CPC ...... *H04L 27/26025* (2021.01); *H04L 1/0003* (2013.01); *H04L 1/0009* (2013.01);
(Continued)

(58) Field of Classification Search
CPC ............. H04L 27/26025; H04L 1/0009; H04L 1/0026; H04L 1/0028; H04L 5/0046; H04L 27/2646
See application file for complete search history.

(56) References Cited

U.S. PATENT DOCUMENTS

2007/0230324 A1 * 10/2007 Li .................. H04L 1/0026
                                                              370/204
2019/0207672 A1    7/2019 Arora
(Continued)

FOREIGN PATENT DOCUMENTS

CN    101848467 A    9/2010
CN    109412996 A    3/2019
(Continued)

OTHER PUBLICATIONS

International Search Report and Written Opinion mailed on Mar. 29, 2021, received for PCT Application PCT/EP2020/080648, Filed on Nov. 2, 2020, 18 pages.
(Continued)

*Primary Examiner* — Curtis B Odom
(74) *Attorney, Agent, or Firm* — XSENSUS LLP

(57) ABSTRACT

A method of transmitting data by a transmitter to a receiver in a wireless communications network. The method comprises receiving data for transmission to the receiver via a communications channel, dividing the data into portions for
(Continued)

transmission, receiving, for each of the portions of data, an indication of channel information from the receiver for use by the transmitter in determining values for one or more communications parameters with which the portion of data should be transmitted, determining the values for the one or more communications parameters based on the received channel information, dynamically generating, for each of the portions of data, a waveform representative of the portion of data, and transmitting each of the portions of data, using the generated waveform representations and in accordance with the values of the one or more communications parameters, to the receiver.

19 Claims, 7 Drawing Sheets

(52) U.S. Cl.
CPC .......... *H04L 1/0026* (2013.01); *H04L 1/0028* (2013.01); *H04L 5/0046* (2013.01); *H04L 27/2646* (2013.01); *H04L 5/0048* (2013.01)

(56) References Cited

U.S. PATENT DOCUMENTS

| | | |
|---|---|---|
| 2019/0246386 A1 | 8/2019 | Li et al. |
| 2019/0349037 A1* | 11/2019 | O'Shea .................. G06N 3/045 |
| 2021/0091838 A1* | 3/2021 | Bai ...................... H04B 7/0639 |

FOREIGN PATENT DOCUMENTS

| | | |
|---|---|---|
| CN | 109474980 A | 3/2019 |
| CN | 110233661 A | 9/2019 |
| WO | WO-2019190036 A1 | 10/2019 |

OTHER PUBLICATIONS

3GPP, "NR; NR and NG-RAN Overall Description; Stage 2 (Release 15)", 3GPP TS 38.300 V15.2.0, Jun. 2018, pp. 1-87.

Holma et al., "LTE for UMTS OFDMA and SC-FDMA Based Radio Access", John Wiley & Sons, 2009, pp. 25-27.

* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2020/080648, filed Nov. 2, 2020, which claims priority to EP 19209541.2, filed Nov. 15, 2019, the entire contents of each are incorporated herein by reference.

BACKGROUND

Field of Disclosure

The present disclosure relates to communications devices, infrastructure equipment and methods for the transmission and reception of data in a wireless communications network and for the dynamic and adaptive generation of waveforms for the transmission of that data in accordance with channel conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

The increasing use of different types of communications devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

Embodiments of the present technique can provide a method of transmitting data by a transmitting entity in a wireless communications network to a receiving entity via a communications channel between the transmitting entity and the receiving entity. The method comprises receiving data for transmission to the receiving entity via the communications channel, dividing the data into portions for transmission, receiving, for each of the portions of data, an indication of channel information from the receiving entity for use by the transmitting entity in determining values for one or more communications parameters with which the portion of data should be transmitted, determining the values for the one or more communications parameters based on the received channel information, dynamically generating, for each of the portions of data, a waveform representative of the portion of data, the waveform representations being generated in accordance with the values of the one or more communications parameters, and transmitting each of the portions of data, using the generated waveform representations and in accordance with the values of the one or more communications parameters, to the receiving entity.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
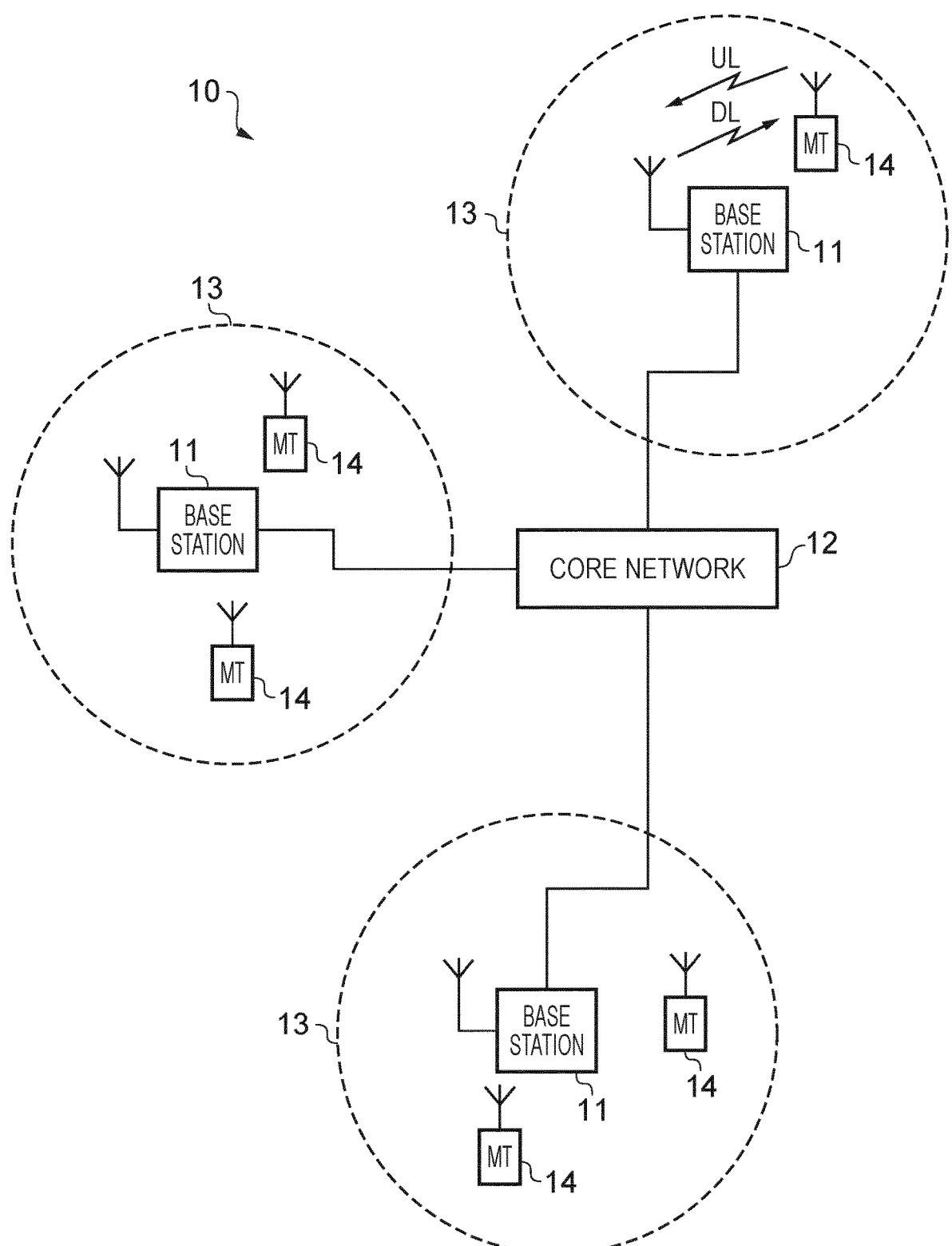
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as BSs/transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);
Massive Machine Type Communications (mMTC);
Ultra Reliable & Low Latency Communications (URLLC); and
Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 0.5 ms to 1 ms with reliability of 99.999% to 99.9999%.

The elements of the wireless access network shown in FIG. 1 may be equally applied to a 5G new RAT configuration, except that a change in terminology may be applied as mentioned above.

Figure 2:
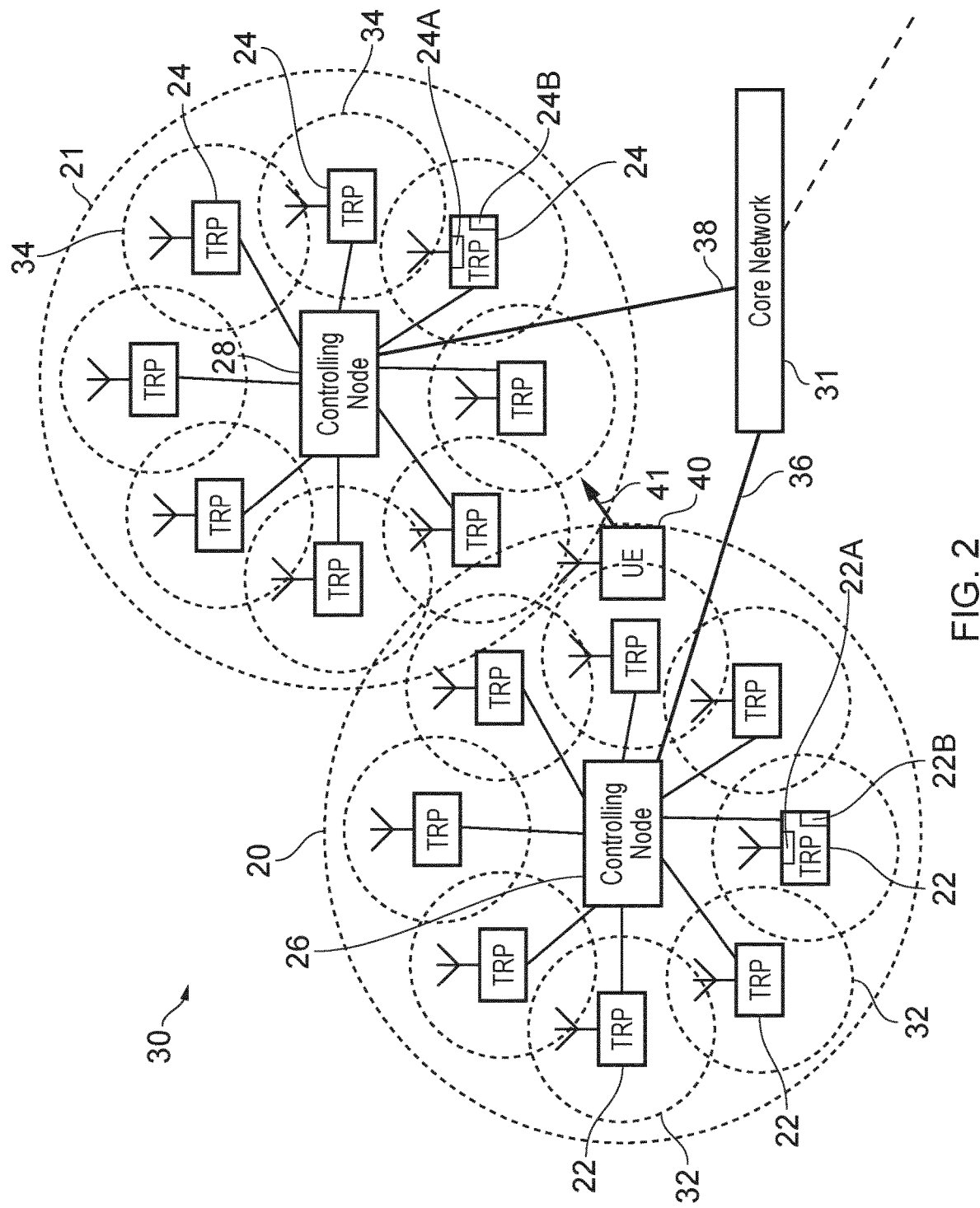
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/ centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
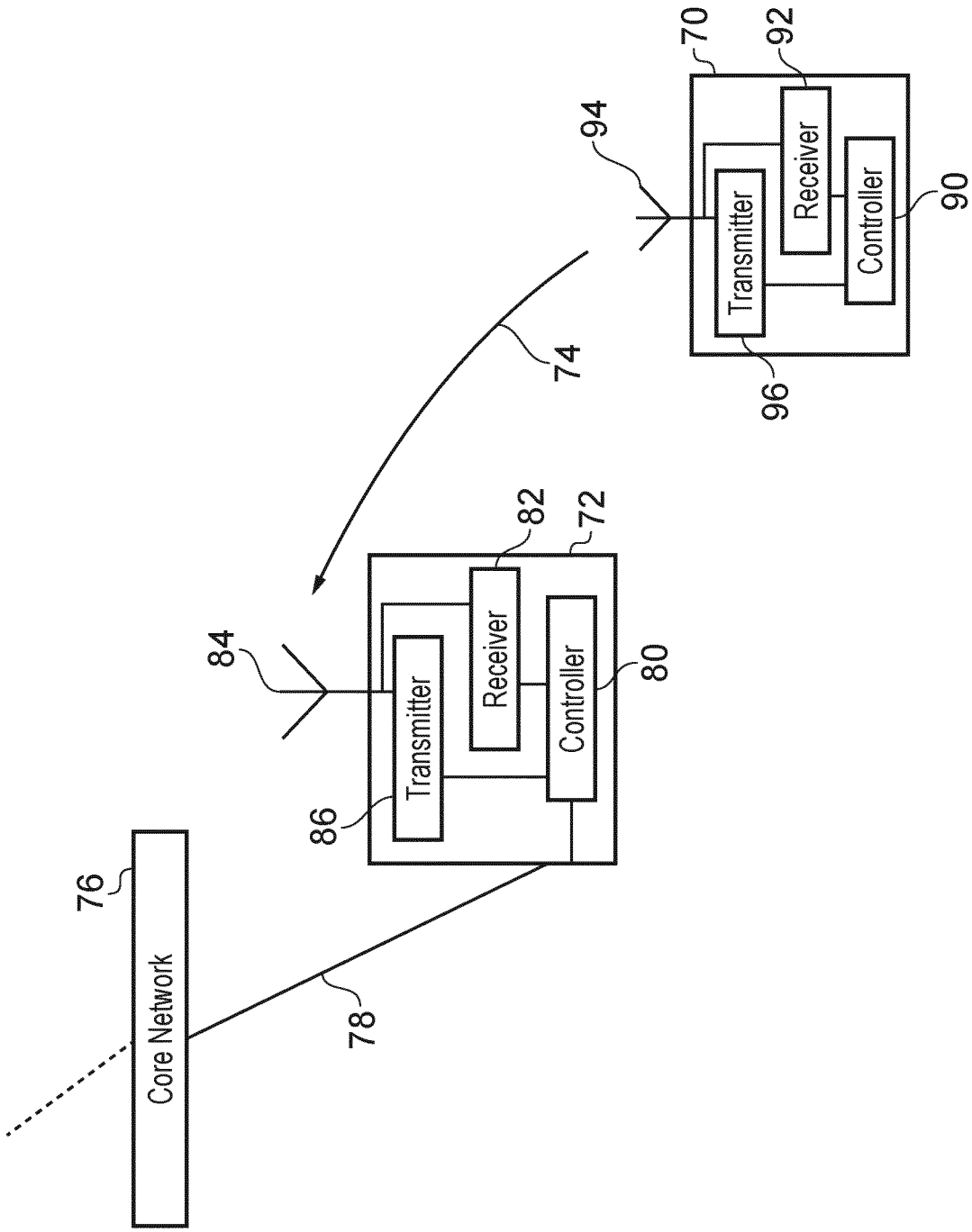
FIG. 3 is a schematic block diagram of an example infrastructure equipment and communications device configured in accordance with example embodiments of the present disclosure.

A more detailed illustration of a communications device 70 and an example network infrastructure equipment 72, which may be thought of as a base station/eNB/gNB 11 or a combination of a controlling node 26, 28 and TRP 22, 24, is presented in FIG. 3. As shown in FIG. 3, the communications device 70 is shown to transmit uplink data to the infrastructure equipment 72 via resources of a wireless access interface as illustrated generally by an arrow 74. The communications device 70 may also receive downlink data transmitted by the infrastructure equipment 72 (not shown). As with FIGS. 1 and 2, the infrastructure equipment 72 is connected to a core network 76 (which may correspond to the core network 12 of FIG. 1 or the core network 31 of FIG. 2) via an interface 78 to a controller 80 of the infrastructure equipment 72. The infrastructure equipment 72 may additionally be connected to other similar infrastructure equipment by means of an inter-radio access network node interface, not shown in FIG. 3.

The infrastructure equipment 72 includes a receiver 82 connected to an antenna 84 and a transmitter 86 connected to the antenna 84. Correspondingly, the communications device 70 includes a controller 90 connected to a receiver 92 which receives signals from an antenna 94 and a transmitter 96 also connected to the antenna 94. The controller 80 is configured to control the infrastructure equipment 72 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 80 may comprise circuitry which is suitably configured/programmed to provide the desired functionality using conventional programming/configuration techniques for equipment in wireless telecommunications systems. The transmitter 86 and the receiver 82 may comprise signal processing and radio frequency filters, amplifiers and circuitry in accordance with conventional arrangements. The transmitter 86, the receiver 82 and the controller 80 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 72 will in general comprise various other elements associated with its operating functionality. Correspondingly, the controller 90 of the communications device 70 is configured to control the transmitter 96 and the receiver 92 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 90 may comprise circuitry which is suitably configured/programmed to provide the desired functionality using conventional programming/configuration techniques for equipment in wireless telecommunications systems. Likewise, the transmitter 96 and the receiver 92 may comprise signal processing and radio frequency filters, amplifiers and circuitry in accordance with conventional arrangements. The transmitter 96, receiver 92 and controller 90 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s).

As will be appreciated the communications device 20 will in general comprise various other elements associated with its operating functionality, for example a power source, user interface, and so forth, but these are not shown in FIG. 3 in the interests of simplicity. The controllers 80, 90 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 4:
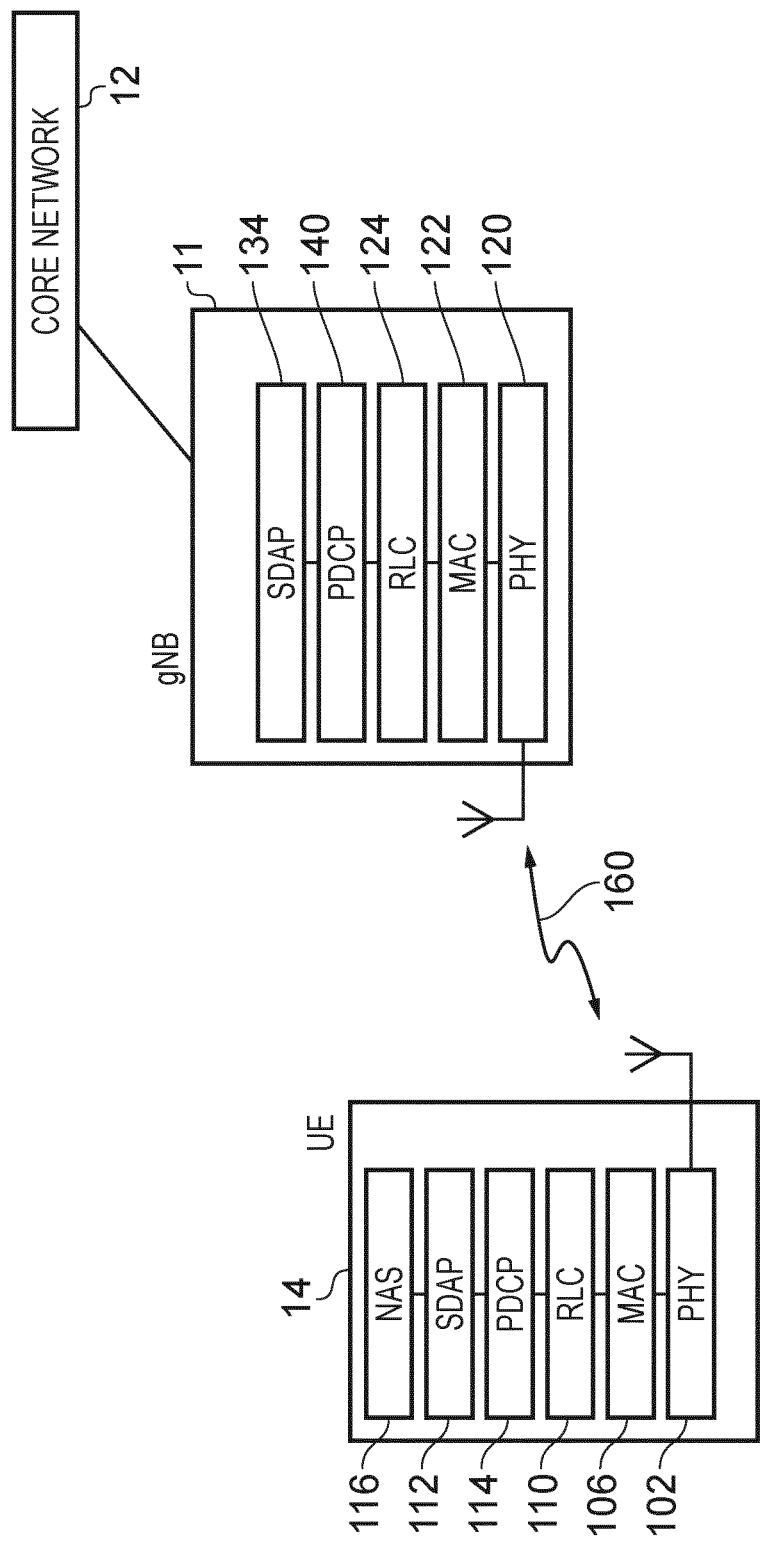
FIG. 4 is a block diagram showing logical protocol entities within a communications device and infrastructure equipment which may be configured to operate in accordance with example embodiments of the present technique.

FIG. 4 is a block diagram showing logical protocol entities within a communications device 14 and the infrastructure equipment 11 which may be configured to operate in accordance with example embodiments of the present technique. The communications device 14 may broadly correspond to the communications device 70 illustrated in FIG. 3 and described above. The infrastructure equipment 11 may broadly correspond to the infrastructure equipment 72 illustrated in FIG. 3 and described above.

Protocol entities may be characterised by functions which they provide to other protocol entities. For example, a physical layer (PHY) protocol entity 102 may control the transmitter 96 and receiver 92 to transmit and receive signals representing data on the wireless access interface. The PHY protocol entity 102 may thus provide an encoding and modulation function for data transmission, and a demodulation and decoding function for data reception. The PHY protocol entity 102 may provide these services to a medium access control (MAC) protocol entity 106 which in turn provides services to a radio link control (RLC) protocol entity 110. The RLC entity 110 interacts with a packet data convergence protocol (PDCP) entity 114, which in turn receives data for transmission from, and passes received data to, a non-access stratum (NAS) layer 116. The NAS layer may be an example of an 'upper layer', with respect to the access stratum (AS) layer comprising the PDCP protocol entity 114 and lower layer protocol entities. In addition, an SDAP (Service Data Adaptation Protocol) protocol entity 112, may reside on top of (i.e. at a higher logical layer than) the PDCP protocol entity 114. Data may be communicated between the communications device 14 and the infrastructure equipment 11 via a wireless access interface 160.

The infrastructure equipment 11 has an RLC entity 124 which has as a peer the RLC entity 110 of the communications device 14 for each radio bearer. The infrastructure equipment 11 has a MAC protocol entity 122 being the peer of the corresponding MAC entity 106 of the communications device 14, and a PHY entity 120 being a peer of the corresponding PHY entity 102 of the communications device 14. At the PDCP protocol layer, the PDCP entity 114 of the communications device 14 has as its peer a PDCP entity 140 of the infrastructure equipment 11. Similarly an SDAP entity 134 of the infrastructure equipment 11 is the peer of the communications device's SDAP entity 116.

Each protocol entity in the communications device 14 may be implemented by the controller 90 in combination with the receiver 92 and transmitter 70 of the communications device. Similarly, each protocol entity in the infrastructure equipment 11 may be implemented by the controller 80 in combination with the receiver 82 and transmitter 86 of the infrastructure equipment.

Link Adaptation

The lower layers (datalink and physical layers) of a mobile communication system are designed to create a radio waveform used for conveying data between a transmitter and receiver given some expected radio propagation conditions between the communicating gNB and the UE. In traditional link-layer designs, these layers are designed to allow the radio-communication system to cope with a given degree of radio propagation impairment. The success of mobile communication systems over the last few decades has been mainly due to the adoption of link adaptation that helps to maximise the throughput. In mobile communication systems such as 3G, 4G and 5G, the link-layer is designed with many choices for the forward error correction (FEC)

code rates, modulation constellations, waveform type, transmit power levels. These can be jointly selected into sets of transmission parameters. Each set can be thought of as a parametrisation for the generation of the transmitted signal resulting from the joint choices that make the set. A given set is expected to generate a waveform or signal for transmission that is different from what another set would generate. Therefore, a deliberate choice can be made of a particular set of transmission parameters with the expectation that it would generate a transmission signal that is somehow more suitable for a prevailing set of radio channel propagation conditions than another set.

This method of designing link-layers is rather long-winded and laborious because it is difficult to deliberately determine the set of choices for all the configuration parameters. This is firstly, and especially, because the process of choosing between particular communication signal processing techniques such as FEC coding schemes (Low Density Parity Check (LDPC) codes, Turbo codes, or Polar codes, for example) is not trivial. Secondly, this is because even after a particular communication signal processing technique has been chosen, deciding on the set of possible configurations of the chosen technique that have to be designed and standardised is also an onerous process. As an example, if we consider only the FEC, then the radio communication system designer may have to first choose the FEC scheme (LDPC, Turbo or Polar codes etc.), then having chosen the FEC scheme, would need to then decide what block sizes and code rates to support etc. before proceeding to a similar process for modulation constellations etc.

Assuming that the radio-communication system has been designed already, such a system design has already chosen a coding scheme. In addition, it supports a designed number of possible codeword block sizes, a designed number of code rates per block size, a designed number of modulation constellations etc. Link adaptation allows the UE and gNB to work together to determine automatically:
1. the prevailing radio propagation conditions that will affect the transmitted data; and
2. the most appropriate set of link-layer configuration parameters (block size, code rate, modulation constellation etc.) to use so as to maximise throughput and/or transmission resource utilisation for the transmitted data within target reliability and/or latency under the prevailing radio propagation conditions.

This choice of an appropriate set of link-layer configuration parameters is also not trivial as it presents a somewhat multi-dimensional problem with the decision depending for example on the given transmission block size and the prevailing radio propagation channel conditions etc. Link adaptation in 4G and 5G systems is limited to the selection of a configuration from amongst a set of designed choices. For link adaptation of the DL, the UE measures channel quality parameters on the reception of reference signals transmitted by the BS. The channel quality is then signalled to the BS as a channel quality indicator (CQI) that can be either narrowband or wideband depending on the bandwidth of the reference signals used for its measurement. Based on this CQI report from the UE, the BS can adapt its DL transmissions to maximise throughput. Similarly, for the UL the BS measures channel quality parameters from reception of sounding reference signals (SRS) transmitted by the UE and uses the results of these measurements to instruct the UE how to adapt UL transmissions to maximise throughput. In 4G and 5G systems, since the FEC type for data channels is fixed, link adaptation therefore only involves the selection from a set of possible FEC code rates and modulation constellations—i.e. the modulation and coding scheme (MCS). Transmit power can also be thought of as an aspect of link adaptation, but is not typically adjusted per transmission block.

For optimum performance, link-layer transmissions in a radio-communication system are supposed to be carefully adapted to the prevailing radio propagation conditions between the transmitter and receiver. As described above, link adaptation in existing 4G and 5G systems is limited to a selection of an MCS configuration from amongst the set of designed choices. Firstly, this choice is typically sub-optimal because there is a finite set of configurations to choose from and secondly, there may be propagation conditions for which none of the existing choices is optimum. The reason for this latter point is that during the link-layer design phase it is not possible to consider all the possible radio propagation conditions that the system would ever be used for. Thirdly, determining the prevailing radio propagation conditions during operation is not a trivial task either. The CQI used in 4G and 5G systems is too much of a coarse indicator addressing mostly the signal to interference and noise ratio (SINR)-related propagation conditions. Other relevant radio propagation conditions may include characteristics such as fading loss, time/frequency selectivity, channel delay spread, Doppler frequency spread, noise, interference, SINR etc. If all these radio channel propagation attributes were assessed, link-adaptation can be more granular and could entail changing any of the code rate, modulation constellation, transmission power, waveform, the number of transmit antennas, frequency hopping pattern etc.

For a fixed radio communication system in which both the BS and the terminals are stationary, the radio propagation conditions are dominated by the geography of its general location. The most optimum link-layer is one designed by taking into account the dominant radio propagation conditions arising from the geography of the given environment. For a mobile communication system however, the UEs move and so the propagation conditions change in accordance with the UEs position within the coverage area of the base station (eNodeB or gNodeB), although these are still significantly influenced by the geography of the area that surrounds the base station. In general, therefore, the range of radio propagation conditions between the base station and UE are influenced by the geography of the surrounding area and this geography is of course different from base station to base station. For example, a BS next to a motorway will likely serve many high speed UEs compared to a BS located in a built-up residential area. The signal received by UEs from a BS next to a mountain or high-rise buildings will be more frequency selective due to multipath propagation than from a BS located in the middle of a flat plain with only low-rise or no buildings.

In accordance with embodiments of the present technique as described herein, a multi-carrier transmission system is assumed with the intention of using a single tap or zero-forcing channel equaliser so as to ease analysis but the equivalent analysis can also be carried out for a single carrier transmission system or indeed a multi-carrier system with other types of receivers. In a multi-carrier transmission system based for example on OFDM such as LTE and NR, for a given OFDM symbol, the propagation channel combined with transmitter and receiver degradations can be described as:

$$B(k)=H(k)e^{j(w_D+w_O)}+N(k)$$

where:

$w_D$ is the doppler frequency due to relative movement between the transmitter and the receiver;

$w_O$ is the combined transmitter and receiver frequency offsets; and

N(k) is the combined noise and interference from all sources impinging on subcarrier k The channel transfer function H(k) can be further expressed as:

$$H(k)=|H(k)|e^{j(\Delta_k+k\emptyset)}$$

where:

$\Delta_k$ is the subcarrier phase shift due to the channel;

Ø is the phase slope due to any timing offset; and

|H(k)| is the amplitude fading coefficient of subcarrier k shaped by frequency selectivity due to multipath propagation.

Assuming all these quantities except for the noise N(k) are known by the receiver, then the effect of the channel on the received signal R(k) can be reversed by multiplying R(k) by Z(k) defined as:

$$Z(k) = \frac{1}{|H(k)|}e^{-j(\Delta_k+k\emptyset+w_D+w_O)}$$

A situation can therefore be envisaged in which if the transmitter knew that its current transmission will traverse a channel whose transfer function is B(k), it could pre-distort its transmissions D(k) by Z(k) such that the received signal R(k) would then be given by:

$$R(k)=D(k)B(k)Z(k)$$

If the noise term N(k) is ignored, then R(k)=D(k) since B(k)Z(k)=[1].

The effect of the noise can also be taken into account by choosing each D(k) from an alphabet of transmission symbols whose size is such that we can get the expected decoding performance with the signal to noise ratio that arises from the noise power $|N(k)|^2$. This can be calculated for example by using the Shannon capacity equation:

$$b(k) = \left\lceil W\log_2\left(1 + \frac{|H(k)|^2}{|N(k)|^2}\right)\right\rceil$$

where W is the subcarrier bandwidth and b(k) is the number of bits to carry in subcarrier k using a constellation of size $2^{b(k)}$. This presupposes that we also have knowledge of the noise term N(k). The use of the ceiling operator ⌈.⌉ reflects the desire to maximise the probability of correct decoding as a series of b(k) on the high side will result in the use of a lower rate FEC code. Also, the Shannon channel capacity equation relates to intrinsic information capacity anyway. Here, the bits that it is desired to carry are coded bits.

This means that the choice of constellation for each individual subcarrier in each OFDM symbol will depend on the signal to noise ratio expected at that subcarrier at the receiver during the said OFDM symbol. Therefore, for subcarriers in which $|N(k)|^2$ is high and so the signal to noise ratio could be low, D(k) would be taken from a low order constellation such as QPSK whilst for subcarriers in which $|N(k)|^2$ is low and so the signal to noise ratio could be high, D(k) would be taken from a higher order constellation such as 64 QAM or 256 QAM.

Deciding for each subcarrier how many bits b(k) to carry therefore determines the constellation size to use for that subcarrier. Assume that the transmission resource size (number of resource elements (RE) allocated for transmission of the current TB of size L bits) is M—these could be on one or more OFDM symbols. Since b(k) is the number of bits to be carried in subcarrier k, the total number of bits that can be carried in the transmission resource of size M can be calculated and used to determine the optimum FEC code rate for this particular TB as:

$$r=L/\Sigma_{k=0}^{M-1}b(k)$$

From the above analysis, it is therefore possible that knowing the exact radio channel characteristics that a given transmission will traverse, the transmitter can format the signal it transmits so as to maximise the probability of decoding at the receiver. But, given a multi-carrier transmission system that adopts this paradigm, some questions are:

1. How would the receiver know which constellation was used for each subcarrier?
2. How would the transmitter know the radio channel characteristics that the next transmission block will traverse?
3. What happens if knowledge of the radio channel characteristics is not 100% accurate?

Normally, the lower layers, including the physical layer (PHY) of a mobile communications system are designed to ensure that the mobile communications system continues to work under some predetermined worst case propagation conditions. There are two significant problems with this approach. Firstly, it is difficult apriori to know all possible propagation conditions under which the system may need to operate. This means that for some propagation conditions typically dependent on location, the mobile communications system may not work effectively. Secondly, to enable operation in the worst conditions the system is designed to work under, the system is typically over-engineered for majority of normal operating conditions. Therefore, when propagation conditions are mild and better than the worst case conditions, the system operates inefficiently. Link adaptation has evolved as a means of changing system parameters to use a less inefficient configuration of the system when conditions are better than the worst case and to change system parameters to use a more inefficient configuration of the system as conditions approach the worst.

Embodiments of the present technique describe paradigms by which to design a link-layer for a mobile communication system that also allows the link design to be adapted to the geography of the location of where a particular BS is installed. Embodiments of the present technique, which are described in detail below, provide system designs which are able to cope with varying challenging radio propagation conditions, through the use of machine learning to adapt to the geography of the area around the BS, allowing for an always-efficient system.

Localised PHY Design Optimisation via Machine Learning

In LTE and NR, the receiver needs knowledge of the radio channel characteristics in order to successfully decode any transport blocks. For the purposes of this disclosure, the channel characteristics include:

1. Channel transfer function;
2. Doppler shift;
3. Frequency offset;
4. Timing offset; and
5. SINR per subcarrier.

Figure 5:
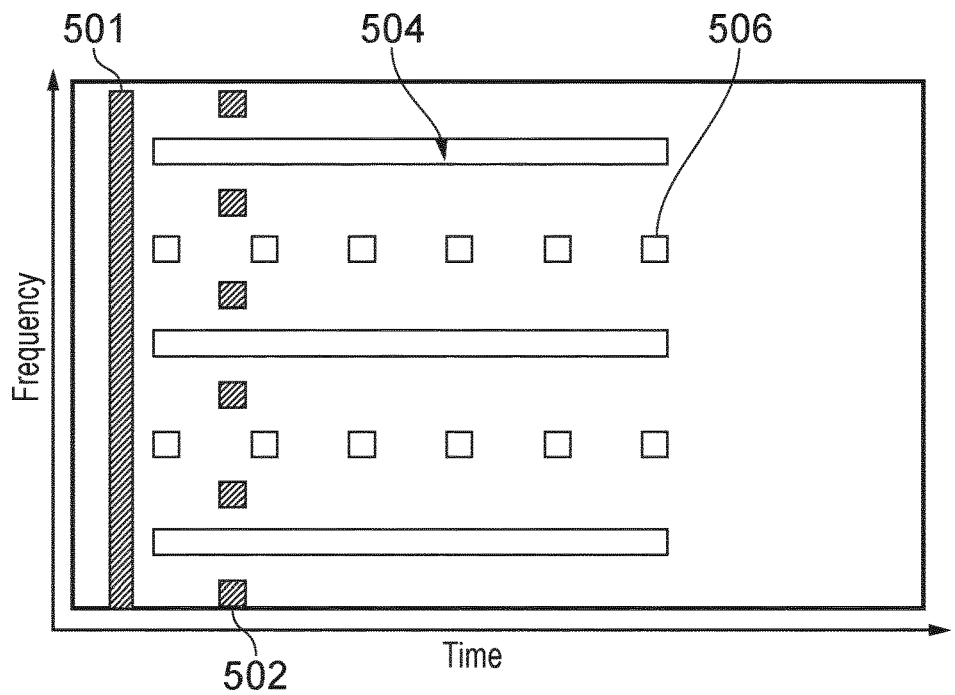
FIG. 5 illustrates an example of how an Orthogonal Frequency Division Multiplexed transmission frame may comprise different kids of reference signals in accordance with embodiments of the present technique.

This information can be accurately estimated by the receiver from suitably configured reference signals transmitted by the transmitter. Some examples are shown in FIG. 5:

Channel transfer function—from a wideband reference signal (e.g. demodulation reference signal or DM-RS) either full-band or subsampled in frequency. Full-band, which is the case for the reference signal 501 in FIG. 5, means the reference OFDM symbol has subcarriers in all subcarrier locations whilst subsampled (see reference signal 502 in FIG. 5) means that the reference subcarriers are only present in a subset of subcarrier positions;

Doppler shift—from reference tones transmitted at known subcarriers, where these reference tones are either continuous reference tones 504 or sampled reference tones 506. Continuous here means the tone is present in all OFDM symbols whilst sampled means only present in some OFDM symbols;

Frequency offset—from the phase differentials of reference tones in successive OFDM symbols;

Timing offset—from phase slope across reference tones in one OFDM symbol; and

SINR per subcarrier—from zero-power reference signals inserted by the transmitter across the signal spectrum.

When the reference signals are sub-sampled, the reference signal estimator in the receiver can interpolate to find intermediate values. Interpolation is only feasible along the frequency axis for a reference signal whose samples occur with a frequency higher than the coherence bandwidth of the multipath channel. Equivalently, interpolation is only feasible along the time axis for a reference signal whose samples occur with at intervals shorter than the coherence time of the channel. Therefore, sampled reference signals must be configured to meet these requirements. Once estimated by the receiver, the channel characteristics form a vector of attributes reflecting the prevailing propagation channel conditions that can be signalled to the transmitter.

In accordance with embodiments of the present technique, a large dataset of such vectors of channel attributes is used in machine learning (ML) to train a transmission agent at the transmitter to output a waveform that encodes the transmission data in a manner that maximizes throughput and also allows the receiver to accurately receive the data in the prevailing radio propagation conditions. Considering the scenario set out above, the ML could for example train the transmission agent to choose the most appropriate constellation size per subcarrier and the code rate applied for the particular TB. At the receiver, there is also a receiver agent that has been similarly trained via ML to select the most appropriate constellation size per subcarrier given the same vector of channel attributes that was used by the transmitter. Embodiments of the present technique set out how such training can be done.

A cellular mobile communication system incorporates many base stations such as eNodeBs and gNBs deployed in varied environments with varying geography that harbour varied human activities that impact radio propagation. As radio propagation conditions are influenced by the geography of the location of the transmitter and receiver, a given ML designed link-layer is unlikely to be optimum for all environments. In embodiments of the present technique, even after initial design and installation, ML is used to adapt each base station at a given site. Each BS includes a transmission agent and a reception agent each comprised of a neural network (NN) that is trained using machine learning.

Figure 6:
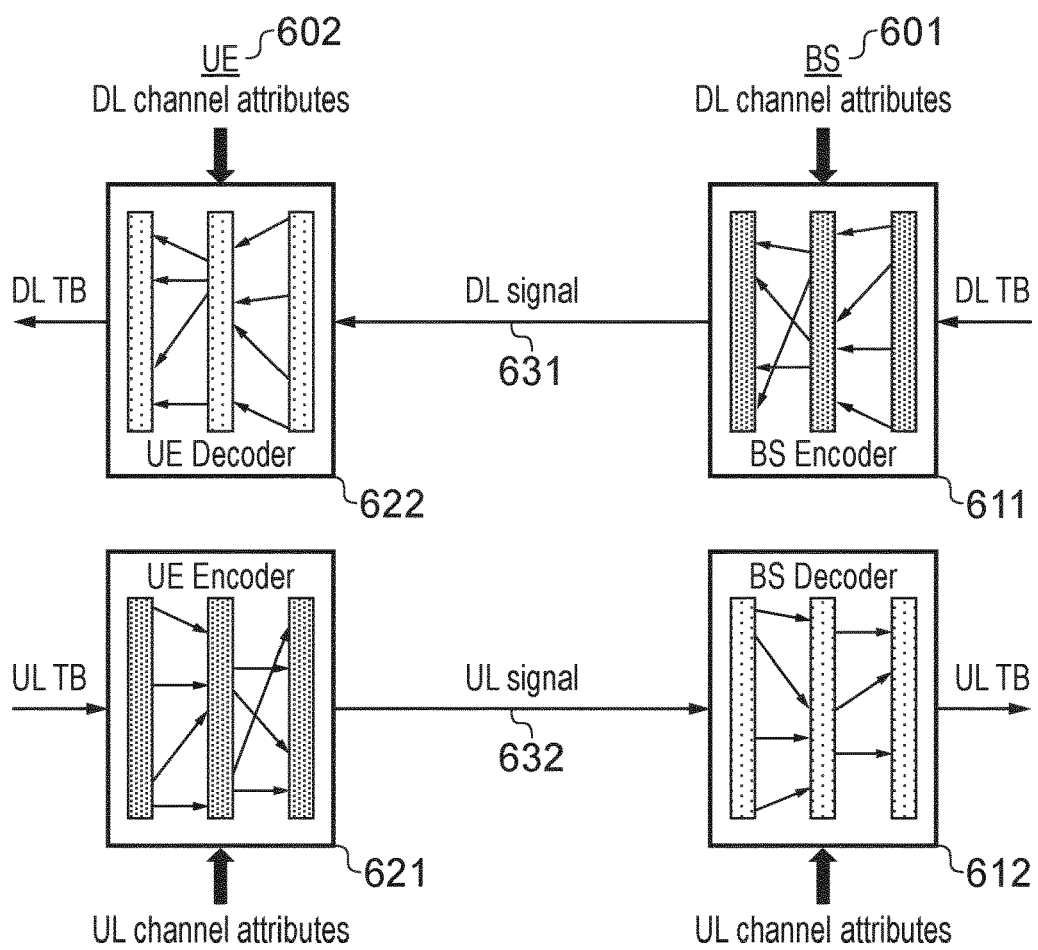
FIG. 6 schematically illustrates how a User Equipment (UE) and a Base Station (BS) may each comprise encoder and decoder neural network (NN) models in accordance with embodiments of the present technique.

Each base station is manufactured with a transmission agent or encoder NN model and reception agent or decoder NN model, each of a known shape as illustrated in FIG. 6. In general, the encoder neural network model 611 at the BS 601 during its operating phase functions as follows: when presented by the upper layers with a DL transport block (TB) and a vector of current DL radio channel attributes from the BS 601 to the served UE 602, the encoder NN model 611 would generate a signal 631 for transmission to the served UE 602 that is representative of the TB but is also adapted to the prevailing channel conditions between the BS 601 and the served UE 602. For a similar encoder NN model 621 at the served UE 602, given an UL TB and a vector of current UL radio channel attributes from the UE 602 to the BS 601, it will also generate a signal 632 for transmission to the BS 601 that is representative of the UL TB and is adapted to the prevailing channel conditions between the UE 602 and the BS 601. In this sense, the NNs 611, 621 at respectively the BS 601 and UE 602 transmitters behave like signal encoders, encoding the TB into a signal 631, 632 respectively, adapted for the prevailing channel conditions. For reception, corresponding decoder NN models 612, 622 can also be envisaged at the BS 601 and UE 602. Each decoder NN model 612, 622, given a received signal 632, 631 that encodes a TB and a vector of the current radio channel attributes for which the signal 632, 631 was encoded, would generate a vector at its output that is the original TB that was transmitted.

The shape of each encoder/decoder NN model is optimized for example during the standardization phase of the communication system, and typically cannot be changed by configuration. Here, the shape of a NN model comprises:

the type of neural network used;

the depth or number of layers in the neural network; and the type and dimension of each layer.

Figure 7:
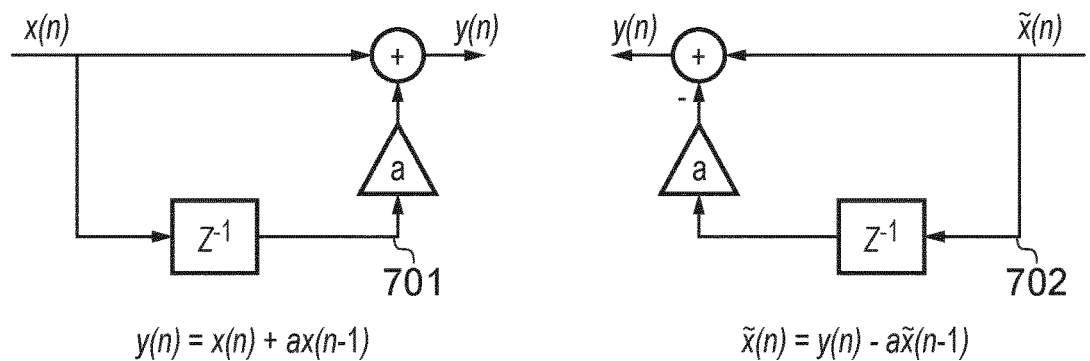
FIG. 7 shows an example of a first order moving average filter and its inverse.

In general, the structure of a decoder NN model is an inverse of the structure of the corresponding encoder NN model in much the same way as the illustration of an example filter 701 and its inverse 702 as shown in FIG. 7. The agreed shape can be chosen in a normal standardisation process wherein stakeholders convince each other of the efficacy of their particular shape by testing them under agreed test assumptions for example. Such a standardisation process will also agree on the set of key attributes or parameters that form the vector of radio channel attributes.

During manufacture, each NN model is trained offline with a sufficiently large dataset of vectors of radio channel attributes that reflect the varying propagation environments that may exist from as many operational geographies as possible. This training dataset can be derived from either channel simulations and/or channel measurement campaigns from which the dataset of vectors of channel attributes are extracted.

Each BS is designed to operate differently during its provisioning phase and operational phase, which are described in detail below.

Provisioning Phase

The provisioning phase is invoked immediately after the BS is installed at a new location as such new locations will likely have unique relief, geography and interference patterns that show a statistically significant difference when compared with the training vectors used during manufacturing. During the provisioning phase, the BS mainly transmits DL specialised reference signals which drive test UEs can use to measure the channel and extract the required vectors of radio channel attributes of the DL propagation channel necessary for further training. These DL specialised reference signals should be pre-defined and known to both BS and UE. These signals such as those illustrated in FIG. 5 have the right properties to allow the receiver to extract the required attributes for the vectors of radio channel attributes. The drive test UEs are capable of extracting the set of relevant DL channel attributes from the reference signals. The extracted vectors of radio channel attributes are then transmitted by the UEs back to the BS. Equivalently, the drive test UEs also transmit specialised UL sounding signals which the BS during its provisioning phase can use to extract the relevant vectors of UL radio channel attributes.

The specialised UL and DL sounding signals are orthogonal to other sounding or reference signals transmitted between the UE and the BS. This ensures that legacy UEs and/or BSs are not impacted by the training. This orthogonality may be achieved by transmitting the signals in unique time-frequency resources or using a new spreading code that somehow also identifies the particular BS. The specialised sounding/reference signals are in general designed to allow easy estimation of the relevant channel attributes for the ML that happens during the provisioning phase.

At the end of the provisioning phase, a cost function is estimated between the current coefficient matrix of the NN model being trained and the training result. The NN coefficient matrix is only updated with the new training result if the cost function shows sufficient difference between the previous configuration and the new configuration.

Figure 8:
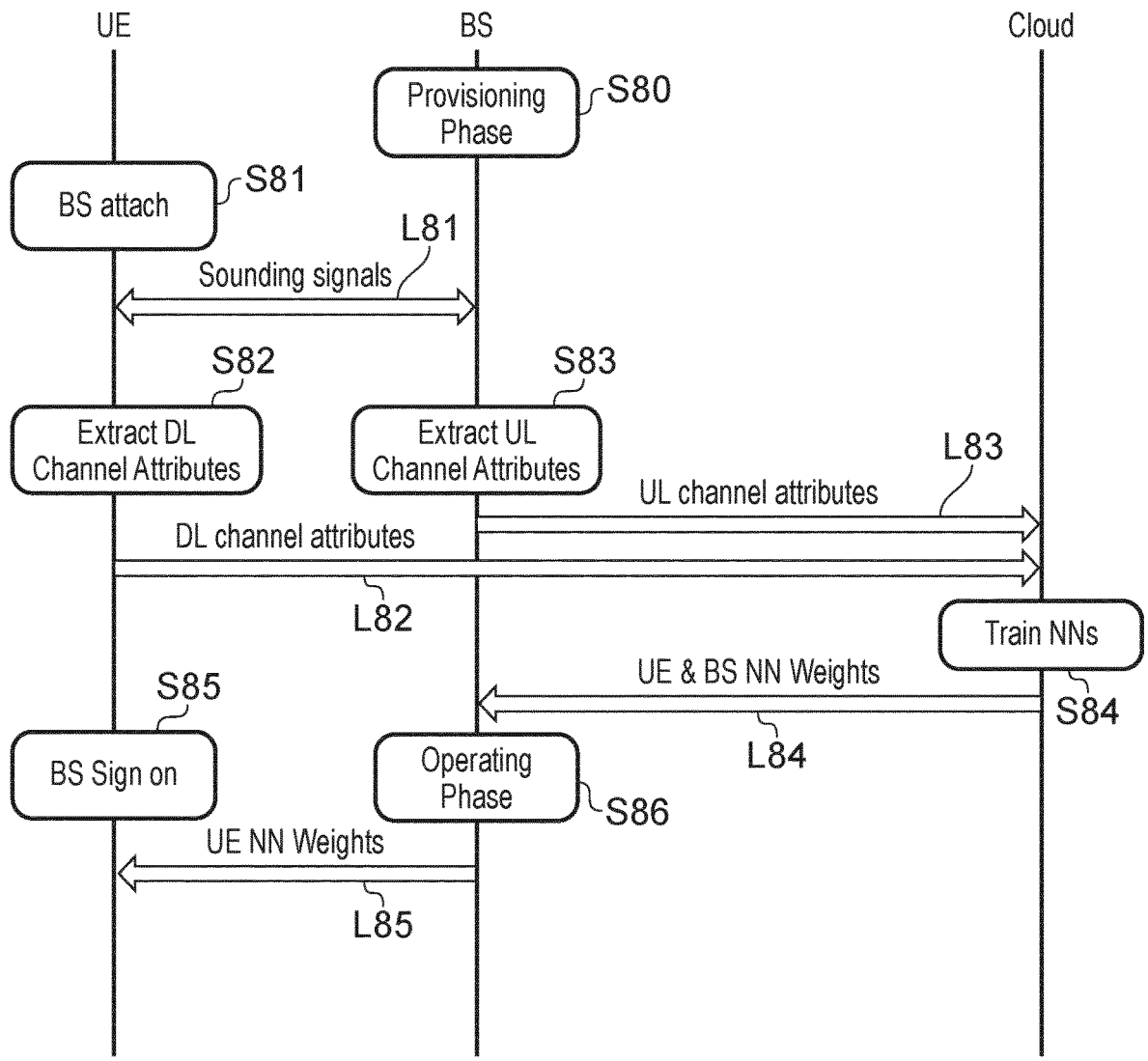
FIG. 8 shows a flow diagram illustrating a process of training a receiving entity by machine learning a model for indicating a number of communications parameters for use in dynamically generating waveform representations for transmission of portions of data by a transmitting entity to the receiving entity in a wireless communications network in accordance with embodiments of the present technique.

In embodiments of the present technique which relate to the ML process during the provisioning phase, the training happens in the cloud. FIG. 8 shows a flow diagram illustrating such a method of training the encoding and decoding NN models for the BS and the UEs during the provisioning phase of a given BS by machine learning. As has been explained before, the BS is designed with a generic model of its encoder and decoder NN models. The training process that takes place during the provisioning phase is used to reconfigure these NN models to adapt them to the specific operating environment of the BS. In FIG. 8, the BS enters the provisioning phase in stage S80 and exits to the operations phase at stage S86.

During step S81, a given drive-test UE using initial access procedures similar to those in LTE and 5G attaches to the new BS in whose coverage area the UE is. Thereafter, in the exchange of signals L81, the UE receives DL reference signals transmitted by the BS whilst the BS receives UL sounding signals transmitted by the UE. During step S82 the UE processes the DL reference signals received from the BS to extract vectors of the DL channel attributes. In a similar fashion, during step S83 the BS processes the UL sounding signals received from the UE to extract vectors of the UL channel attributes. In transmission L83, the BS transmits to a remote machine learning server in the cloud the extracted vectors of the UL channel attributes. Similarly, in transmission L82 the UE transmits via the BS to the remote machine learning server the extracted vectors of the DL channel attributes. It should be understood that during a typical provisioning phase, there are many drive-test UEs similarly calculating from reference signals received from the new BS DL channel attributes and delivering these to the machine learning server. Similarly, the BS is receiving sounding signals from many drive-test UEs from which it extracts UL channel attributes for delivery to the machine learning server. Therefore, it should be evident that by step S84, the machine learning server in the cloud would have received a multiplicity of such vectors of channel attributes from each of a multiplicity of drive-test UEs and the new BS undergoing commissioning. Then in process S84, the machine learning server uses the large database of received UL channel attributes to train the neural network models embedded as the encoder NN model for the UE and its inverse, the decoder NN model for the BS. Similarly, the machine learning server uses the large database of received DL channel attributes to train the neural network models embedded as the encoder NN model for the BS and its inverse, the decoder NN model for the UE. At the end of the training process S84, the ML server tests the retrained configurations of the encoder and decoder NN models against the existing configurations using in each case a cost function. If in the case of each NN model, the retrained model configuration is sufficiently different from the existing configuration, the ML server transfers in L84 the new configuration for the corresponding UE and BS encoder NN models and the UE and BS decoder NN models to the BS. On receiving these, the BS stores the configurations and then enters its operational phase in S86. During the normal operations phase, after a UE signs up to the network through this particular BS in S85, to enable the UE to transmit data to and receive data from the BS during normal operations, the BS transmits to the UE in L85 the encoder and decoder NN model configurations previously received and stored from the ML server.

In summary, the BS forwards all vectors of channel attributes received from the drive test UEs or estimated by the BS from UL sounding/reference signals via the core network to the cloud (i.e. remote server). The cloud uses these vectors of channel attributes from multiple drive test UEs at various locations within the coverage area of the newly installed BS to re-train the generic NN models for the encoders and decoders at both the BS and the UEs. As the shapes of the NN models are known, it is expected that this training will mainly result in changes in the coefficient matrix of each NN model. At the end of the training phase, the new coefficient matrices of the NN models will be sent from the cloud via the core network to the particular BS. The encoder and decoder NN models at the BS are then updated with the new coefficient matrices. The coefficient matrices for the encoder and decoder NN models for the UE will be stored and delivered to each UE when it first attaches to, hands over to or re-selects the particular BS.

As described above, at the end of the provisioning phase, a cost function is estimated between the current coefficient matrix of each of the NN models being trained and the training result. The NN coefficient matrix stored at the BS is only updated with the new training results if the cost function shows sufficient difference between the previous configuration and the new one. In other words, the method further comprises evaluating, by the remote server on completion of the training based on the received multiplicity of the estimated channel attributes from the receiving entity, a cost function between the first channel encoder/decoder NN model and a second channel encoder/decoder NN model newly trained, determining (by the remote server), based on the evaluated cost function, if the first channel encoder/decoder NN model configuration is sufficiently different from the second channel encoder/decoder NN model configuration by more than a threshold amount, and if so, transmitting (by the remote server), to the BS, the configuration of the second channel encoder/decoder NN model.

As described above, the one or more channel attributes may be combinations of: a transfer function of the communications channel, a Doppler shift of signals transmitted between the transmitting entity and the receiving entity over the communications channel, a frequency offset between the transmitting entity and the receiving entity, a timing offset between the transmitting entity and the receiving entity, and/or a signal-to-interference-plus-noise, SINR, ratio between a power with which a transmitted signal is received by the receiving entity and the combination of a power of interfering signals received by the receiving entity and a power of background noise detected at the receiving entity.

In some arrangements of embodiments of the present technique related to the ML process, the dataset of vectors of channel attributes is extracted from raw channel realisations. Each channel realisation is a waveform representative of the output of the channel from a transmission of a reference symbol of any of the types illustrated in FIG. 5. Channel realisations are either generated by channel simulators suitably configured with parameters determined from traditional radio measurement or channel sounding campaigns or; measured live from reference signals transmitted by the BS and UEs. In a supervised learning process, each channel realisation is pre-processed to extract the vector of channel attributes and calculate for example the number of bits per resource element <b(k)> and the FEC code rate r for all the possible TB and resource allocation sizes. A sample pseudo code for extracting such a data set is illustrated below.

```
For i = chlRealisationNum (1 to Num_chlRealisations)
    v(i, :) = Extract (vector of channel attributes)
    For M = rscAllocationSize (1 to Num_rscAllocationSize)
        For L = tbSize(1 to Num_ tbSize)
            For k = 1:M
                b(M,L, k) = Estimate(number of bits per RE);
            end
            numCodedBits = sum( b(M,L,:) )
        end
        code_rate(M,L) = L/numCodedBits
    end
    store( {v(i, :); b(M,L,:);code_rate(M,:) })
```

The supervised training accepts in turn a vector of channel attributes, a particular TB size and a resource allocation as inputs and outputs a vector of bits per subcarrier <b(k)> and FEC code rate. The cost function driving the training is then computed between the machine generated {<b̂(k)>, r̂} and {<b(k)>, r} which were extracted from the particular channel realisation.

In accordance with at least some arrangements of embodiments of the present technique, the provisioning phase, which is in other words a method of training within a receiving entity by machine learning a model for determining communications parameters for use in dynamically generating waveform representations for transmission of portions of data by a transmitting entity to the receiving entity in a wireless communications network, the receiving entity comprising at least one of an encoder neural network, NN, and a decoder NN, may comprise: receiving, by the receiving entity, one or more reference signals from each of a plurality of transmitting entities, the plurality of transmitting entities being located at different geographical positions relative to the receiving entity, estimating, by the receiving entity based on the received one or more reference signals from each of the plurality of transmitting entities, one or more channel attributes of a communications channel between the receiving entity and the each of the plurality of transmitting entities, transmitting, by the receiving entity, an indication of the one or more estimated channel attributes for each of the plurality of transmitting entities to a remote server, and receiving, by the receiving entity, an indication of a first NN model configuration for the at least one of the encoder NN and the decoder NN for use in determining values for one or more communications parameters, the indication of the first NN model configuration being received from the remote server and being dependent on the indicated one or more estimated channel attributes from each of the plurality of transmitting entities.

In accordance with at least some arrangements of embodiments of the present technique, the provisioning phase may further comprise: evaluating, by the remote server after training the encoder/decoder NN models with the plurality of estimated channel attributes from the receiving entity (those skilled in the art would appreciate that this plurality of estimated channel attributes comprises the one or more channel attributes estimated for each of the plurality of transmitting entities based on the reference signal(s) received from that transmitting entity), a cost function between the first NN model configuration and a second NN model configuration for the at least one of the encoder NN and the decoder NN, the second NN model configuration either having previously been transmitted by the remote server to the receiving entity or having been implemented for the at least one of the encoder NN and the decoder NN of the receiving entity at a time of manufacture of the receiving entity, determining, based on the evaluated cost function, if the first NN model configuration is different from the second NN model configuration by more than a threshold amount of the cost function, and if so, transmitting, to the receiving entity, an indication that the first NN model configuration is for use in replacing the second NN model configuration.

Operational Phase

The BS can enter its operational phase after its provisioning phase. In the operational phase, the BS is integrated into the network and operates as one of the BSs of the network for normal subscriber traffic. During the operational phase, the BS works as normal transmitting signals, data and signaling on the DL to UEs whilst receiving signals, data and signaling via the UL from UEs. In the operational phase, for each TB to be transmitted in the UL, the BS sends to the UE detailed information to use for generating the waveform for UL transmission. Similarly, for each TB to be transmitted in the DL, the UE sends to the BS detailed information for the BS to use in deciding what kind of waveform to generate for the DL transmission. In the various embodiments that follow, the exact details of the information exchanged differ.

Figure 9:
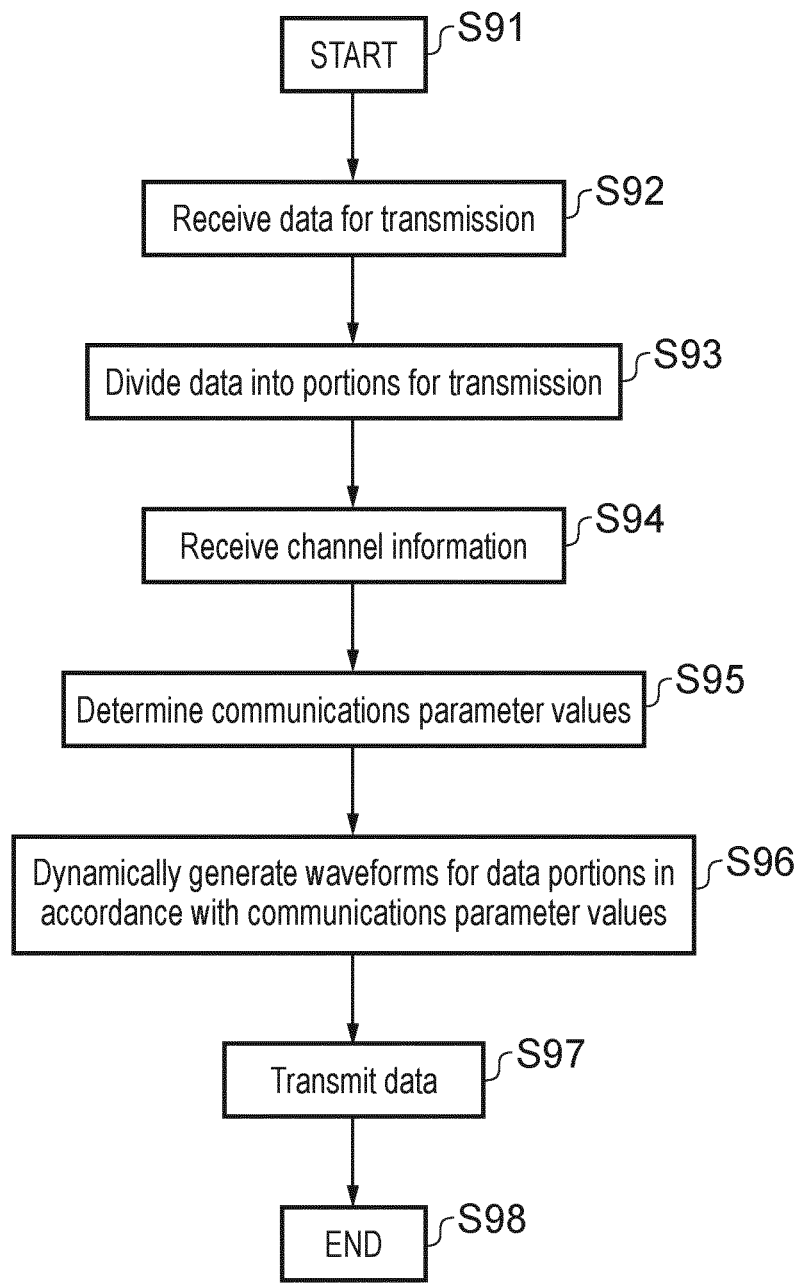
FIG. 9 shows a flow diagram illustrating a process of transmitting data by a transmitting entity in a wireless communications network to a receiving entity via a communications channel between the transmitting entity and the receiving entity in accordance with embodiments of the present technique.

FIG. 9 shows a flow diagram illustrating such a method of transmitting data by a transmitting entity in a wireless communications network to a receiving entity via a radio channel between the transmitting entity and the receiving entity during an operational phase.

The method starts in step S91. In step S92, the method comprises receiving (or generating) data for transmission to the receiving entity via the communications channel. In step S93, the method comprises dividing the data into portions for transmission. In step S94, the process comprises receiving, for each of the portions of data, an indication of channel attributes from the receiving entity for use by the transmitting entity in determining values for one or more communications parameters with which the portion of data should be transmitted, before involving, in step S95, determining the values for the one or more communications parameters based on the received channel attributes and the portion of data for transmission. In step S96, the process comprises dynamically generating, for each of the portions of data, a waveform representative of the portion of data, the waveform representations being generated in accordance with the values of the one or more communications parameters, and in step S97, the method involves transmitting each of the portions of data, using the generated waveform representations and in accordance with the values of the one or more communications parameters, to the receiving entity. The process ends in step S98.

As described above, the determining the values for the one or more communications parameters based on the received channel attributes and/or the dynamically generating for each of the portions of data, the waveform representative of the portion of data is done by the relevant encoder NN model that was trained using machine learning during the provisioning phase.

In a first arrangement of embodiments of the present technique related to payload transmission, the encoder NN model instead of outputting a signal ready for transmission is trained instead to output a vector of configuration parameters representing choices of the link-layer designed settings for example some or all of MCS, SCS, power, waveform type etc. In other words, the channel information is used to generate a vector comprising the values of the one or more communications parameters, the vector being one of a plurality of predefined vectors known by both the transmitting entity and the receiving entity. These vectors can be input into a waveform generation stage (S96 in FIG. 9) to generate a waveform suitably adapted to the channel attributes for transmitting the portion of data. Using such a vector of transmission parameters, the BS would schedule transmissions on either the UL or DL, depending on whether the channel attributes used to generate the parameters vector were from the UL or the DL respectively, to be transmitted using the set of system configuration parameters output from the encoder NN models. This arrangement has the advantage that no decoder NN models are required as the encoder NN models only decide between vectors of existing link-layer configuration parameters. The signalling required at UE sign-on for transmitting the coefficient matrix of the UE decoder NN model is not necessary any longer. This arrangement mainly exploits ML to optimize the link-adaptation process and so represents a backward compatible implementation issue in current systems such as 4G and 5G. In this way, reception by an existing 4G or 5G receiver from a ML-trained transmitter without knowledge of the use of a ML-trained transmitter is also possible.

Here, and in other arrangements of embodiments of the present technique, the communications parameters comprise one or more of: a type of waveform that should be used to represent the portion of data, a power with which the portion of data should be transmitted, a modulation and coding scheme that should be used for the transmission of the portion of data, and a subcarrier spacing that should be used for the transmission of the portion of data. It should be appreciated by those skilled in the art that such a list of communications parameters as listed in this paragraph are examples of the communications parameters that can be used for the transmission of data, and such a list of parameters is in no way intended to be exhaustive or limiting.

In another arrangement of embodiments of the present technique related to payload transmission during the operational phase, for each TB to be transmitted in the UL, the detailed information the BS sends to the UE to use for generating the waveform for UL transmission includes the current vector of UL channel attributes. The UE inputs this vector as well as the TB into its encoder NN model to generate the waveform that is transmitted to the BS. In other words, the channel information comprises a vector comprising the values of one or more channel attributes of the communications channel, wherein the values of the one or more channel attributes in the vector are determined by the receiving entity based on one or more reference signals transmitted by the transmitting entity to the receiving entity, and the method comprises dynamically generating, for each of the portions of data, the waveform representative of the portion of data, the waveform representations being generated in accordance with the received values of the one or more channel attributes. Similarly, for each TB to be transmitted in the DL, the detailed information the UE sends to the BS for the BS to use for generating the waveform for the DL transmission includes the current vector of DL channel attributes. The BS inputs this vector as well as the TB into its encoder NN model to generate the waveform that is transmitted to the UE. In this arrangement, a decoder NN model suitably trained as the inverse of the encoder NN model is required at the receiver to decode the TB. This decoder NN model at the UE is already aware of the vector of DL channel attributes since this was derived at the UE. Similarly, decoder NN model at the BS is also aware of the vector of UL channel attributes since this was derived at the BS. These vectors do not therefore have to be transmitted for decoding purposes.

In another arrangement of embodiments of the present technique related to payload transmission during the operational phase, the encoder NN model uses the current vector of channel attributes to determine the number of bits to carry per subcarrier and, in combining all the number of bits for all the subcarriers in the set of transmission resources allocated for the TB, determines the FEC rate to apply to the TB. The transmission waveform is then generated as normal except that different resource elements or subcarriers within the transmission resource are modulated with varying constellations. The transmitting entity also signals the vector of channel attributes to the receiving entity. The receiving entity inputs the vector of channel attributes into its decoder NN model whence it determines the modulation order for each of the resource elements in the resource allocation thereby allowing the receiving entity to decode the TB.

In another arrangement of embodiments of the present technique related to payload transmission during the operational phase, the network operates using TDD and so there is channel reciprocity between the UL and the DL and so each of the UE and BS do not have to transmit their respective estimated vectors of radio channel attributes to the other.

In all above described arrangements of embodiments of the present technique, if the actual channel conditions change too much between the estimation of the current vector of radio channel attributes and its use in generating a waveform for transmission of the TB, the decoder NN model may be unsuccessful in decoding the transmission. In such a case, normal recovery procedures for this TB such as HARQ-based re-transmissions with a newly estimated vector of radio channel attributes can save the day.

In some arrangements of embodiments of the present technique related to the ML process during the operational phase, sounding/reference signals are regularly inserted into UL and DL transmissions. The DL sounding/reference signals are to be used by UEs to estimate vectors of channel attributes of the DL channel whilst the BS uses the UL sounding/reference signals to estimate vectors of channel attributes of the UL channel. In other words, one of the transmitting/receiving entities is configured to estimate the values of one or more channel attributes of the communications channel based on one or more reference signals received by the one of the transmitting/receiving entities from the other of the transmitting/receiving entities.

These vectors of channel attributes are used with any TBs to be transmitted as inputs into the encoder NN model of respectively the BS and the UE. In other words, the transmitting entity is configured to dynamically generate, for each of the portions of data, the waveform representative of the portion of data, the waveform representations being generated in accordance with the estimated values of the one or more channel attributes, and to transmit, to the receiving entity the dynamically generated waveform.

Further, the vectors of DL channel attributes are sent by each UE for example as specialised measurement reports or via some other standardised radio resource management protocols to the BS for onward forwarding to the cloud. The BS also sends the vectors of UL channel attributes it estimates to the cloud in a similar fashion. This allows the cloud to continuously fine-tune the training for the encoder and decoder NN models associated with the particular BS and the UEs it serves. In other words, the transmitting entity is configured to transmit an indication of the one or more estimated channel attributes to a remote server, and to receive an indication of a first NN model configuration for the at least one of the encoder NN and the decoder NN for use in determining values for one or more communications parameters, the indication of the first NN model configuration being received from the remote server and being associated with the plurality of estimated channel attributes The new configuration of the encoder and decoder entities is compared with the existing configurations using a cost function. When the cost function suggests that the training coefficient matrix of any of the encoder and decoder NN models is sufficiently different from its current coefficient matrix, the weight matrices of the encoder and/or decoder NN models can be updated with the new ones. Otherwise, it is left to operate as normal. Such updates can happen at idle times for the BS or when there are no TBs to schedule for all its attached UEs. In other words, the transmitting entity is configured to evaluate a cost function between the first NN model configuration and a second NN model configuration for the at least one of the encoder NN and the decoder NN, the second NN model configuration either having previously been received by the receiving entity from the remote server or having been implemented for the at least one of the encoder NN and the decoder NN of the receiving entity at a time of manufacture of the receiving entity, to determine, based on the evaluated cost function, if the first NN model configuration is different from the second NN model configuration by more than a threshold amount of the cost function, and if so, to determine that the first NN model configuration should replace the second NN model configuration. In at least some arrangements of embodiments of the present technique, the transmitting entity is configured to determine that the second NN model configuration should be replaced with the first NN model configuration when the transmitting entity is operating in accordance with an idle mode and/or when the transmitting entity has no data to transmit to the receiving entity.

Two example arrangements for replacing the second NN model configuration with the first NN model configuration as described above are as follows:
 (1) Network suspends all UL & DL scheduling to give the BS time to change the NN model configurations of all UEs and change the configurations of its own encoder/decoder NN hardware too. In other words, the transmitting entity is configured to determine that the transmitting entity has no data to transmit to the receiving entity by determining that the wireless communications network has suspended scheduling of uplink and downlink signals at the transmitting entity. In one arrangement, after suspending all scheduling, the network uses RRC dedicated signalling to each RRC-connected mode UE and/or SI update command to all RRC-inactive/RRC-idle/RRC-Connected mode UEs to deliver the new encoder/decoder NN model configurations. In other words, the transmitting entity is configured to transmit an indication to the receiving entity that the first NN model configuration should replace the second NN model configuration, the indication and the first NN model configuration each being transmitted using one of system information and dedicated signalling. After so updating the encoder/decoder NN model configurations in the UEs, the BS also updates its encoder/decoder NN hardware and then the network resumes normal UL/DL scheduling. In other words, the transmitting entity comprises storage means, the storage means storing the second NN model configuration, and the transmitting entity is configured to delete the second NN model configuration from the storage means and to store the first NN model configuration in the storage means. This arrangement may have some impact on URLLC-type traffic because of its latency constraints.
 (2) Network waits for a time when the BS is relatively idle—that is, there are no DL transmissions to be scheduled and all UEs previously in RRC-Connected and RRC-Inactive modes are now in RRC-inactive or RRC-idle modes. Then the network updates the encoder/decoder NN models in the UEs using a broadcast SI update command. In other words, the transmitting entity is configured to broadcast an indication, receivable by the receiving entity, that the first NN model configuration should replace the second NN model configuration, and to broadcast, receivable by the receiving entity, the first NN model configuration.

It should be appreciated that the cost function evaluation as referred to herein, both those carried out during the provisioning phase and the operational phase, will be carried out at the remote machine learning (ML) server (i.e. cloud). The BS comprises some storage in which it can hold encoder/decoder model configurations for the BS and UEs. When first turned on, the BS reads the stored model configurations and uses them to configure the encoder/decoder NN hardware. The equivalent UE encoder/decoder NN hardware is configured at UE signup via system information (SI) broadcast for example.

At the end of any training phases at the remote ML server, the ML server will read the model configurations stored at the BS (second) configuration and then execute the cost function between the newly trained model (first) and second (stored at BS) configuration. If the threshold is reached or exceeded, the ML server downloads the first NN model configuration to the BS where it replaces the first model configuration in the store. It should be noted that if the first and second configurations are not sufficiently different, the first configuration(s) is not downloaded to the BS storage. At any download time, each encoder/decoder NN hardware in the BS and/or UEs is still configured with the second NN model configuration, but the BS is now aware that the stored configuration is new and so waits for an appropriate time (e.g. when it has no UL data to transmit as described above) to update both its encoder/decoder NN hardware and those of all the UEs.

As described above and herein, the transmitting entity may be one of a communications device (i.e. UE) and a network infrastructure equipment (i.e. BS/eNB/gNB), and the receiving device may be the other of the communications device (i.e. UE) and the network infrastructure equipment (i.e. BS/eNB/gNB). Each of the transmitting entity and the receiving entity may comprise at least one of encoding means formed by a neural network trained using machine learning and decoding means formed by a neural network trained using machine learning.

Those skilled in the art would appreciate that the methods shown by FIGS. 8 and 9 may be adapted in accordance with embodiments of the present technique. For example, other preliminary, intermediate, or subsequent steps as described herein may be included in the method, or the steps may be performed in any logical order. Though embodiments of the present technique have been described largely by way of the methods shown by FIGS. 8 and 9, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of transmitting data by a transmitting entity in a wireless communications network to a receiving entity via a communications channel between the transmitting entity and the receiving entity, the method comprising receiving data for transmission to the receiving entity via the communications channel, dividing the data into portions for transmission, receiving, for each of the portions of data, an indication of channel information from the receiving entity for use by the transmitting entity in determining values for one or more communications parameters with which the portion of data should be transmitted, determining the values for the one or more communications parameters based on the received channel information, dynamically generating, for each of the portions of data, a waveform representative of the portion of data, the waveform representations being generated in accordance with the values of the one or more communications parameters, and transmitting each of the portions of data, using the generated waveform representations and in accordance with the values of the one or more communications parameters, to the receiving entity.

Paragraph 2. A method according to Paragraph 1, wherein the dynamically generating, for each of the portions of data, the waveform representative of the portion of data, comprises using a model trained using machine learning.

Paragraph 3. A method according to Paragraph 1 or Paragraph 2, wherein the channel information is used to generate a vector comprising the values of the one or more communications parameters, the vector being one of a plurality of predefined vectors known by both the transmitting entity and the receiving entity.

Paragraph 4. A method according to any of Paragraphs 1 to 3, wherein the channel information comprises a vector comprising the values one or more channel attributes of the communications channel, wherein the values of the one or more channel attributes in the vector are determined by the receiving entity based on one or more reference signals transmitted by the transmitting entity to the receiving entity, and the method comprises dynamically generating, for each of the portions of data, the waveform representative of the portion of data, the waveform representations being generated in accordance with the values of the one or more communications parameters and in accordance with the received values of the one or more channel attributes.

Paragraph 5. A method according to any of Paragraphs 1 to 4, comprising estimating the values of one or more channel attributes of the communications channel based on one or more reference signals received by the transmitting entity from the receiving entity.

Paragraph 6. A method according to Paragraph 5, comprising dynamically generating, for each of the portions of data, the waveform representative of the portion of data, the waveform representations being generated in accordance with the values of the one or more communications parameters and in accordance with the estimated values of the one or more channel attributes, and transmitting, to the receiving entity, a vector signal comprising the estimated values of the one or more channel attributes.

Paragraph 7. A method according to Paragraph 5 or Paragraph 6, wherein the receiving entity comprises at least one of an encoder neural network, NN, and a decoder NN, the method comprising transmitting, by the transmitting entity, an indication of the one or more estimated channel attributes to a remote server, receiving, by the transmitting entity, an indication of a first NN model configuration for the at least one of the encoder NN and the decoder NN for use in determining values for one or more communications parameters, the indication of the first NN model configuration being received from the remote server and being associated with the one or more estimated channel attributes.

Paragraph 8. A method according to Paragraph 7, comprising evaluating, by the transmitting entity, a cost function between the first NN model configuration and a second NN model configuration for the at least one of the encoder NN and the decoder NN, the second NN model configuration either having previously been received by the receiving entity from the remote server or having been implemented for the at least one of the encoder NN and the decoder NN of the receiving entity at a time of manufacture of the receiving entity, determining, based on the evaluated cost function, if the first NN model configuration is different from the second NN model configuration by more than a threshold amount of the cost function, and if so, determining that the first NN model configuration should replace the second NN model configuration.

Paragraph 9. A method according to Paragraph 8, wherein the transmitting entity is configured to determine that the first NN model configuration should replace the second NN model configuration when the transmitting entity is operating in accordance with an idle mode and/or when the transmitting entity has no data to transmit to the receiving entity.

Paragraph 10. A method according to Paragraph 9, wherein the transmitting entity is configured to determine that the transmitting entity has no data to transmit to the receiving entity by determining that the wireless communications network has suspended scheduling of uplink and downlink signals at the transmitting entity.

Paragraph 11. A method according to Paragraph 9 or Paragraph 10, wherein the transmitting entity is configured to transmit an indication to the receiving entity that the first NN model configuration should replace the second NN model configuration, the indication and the first NN model configuration each being transmitted using one of system information and dedicated signalling.

Paragraph 12. A method according to any of Paragraphs 9 to 11, wherein the transmitting entity is configured to broadcast an indication, receivable by the receiving entity, that the first NN model configuration should replace the second NN model configuration, and to broadcast, receivable by the receiving entity, the first NN model configuration.

Paragraph 13. A method according to any of Paragraphs 8 to 12, wherein the transmitting entity comprises storage means, the storage means storing the second NN model configuration, and the transmitting entity is configured to delete the second NN model configuration from the storage means and to store the first NN model configuration in the storage means.

Paragraph 14. A method according to any of Paragraphs 1 to 13, wherein the communications parameters comprise one or more of:
a type of waveform that should be used to represent the portion of data,
a power with which the portion of data should be transmitted,
a modulation and coding scheme that should be used for the transmission of the portion of data, and
a subcarrier spacing that should be used for the transmission of the portion of data.

Paragraph 15. A method according to any of Paragraphs 1 to 14, wherein the transmitting entity comprises at least one of encoding means formed by a neural network trained using machine learning and decoding means formed by a neural network trained using machine learning.

Paragraph 16. A method according to any of Paragraphs 1 to 15, wherein the receiving entity comprises at least one of encoding means formed by a neural network trained using machine learning and decoding means formed by a neural network trained using machine learning.

Paragraph 17. A method according to any of Paragraphs 1 to 16, wherein the transmitting entity is one of a communications device and a network infrastructure equipment.

Paragraph 18. A method according to any of Paragraphs 1 to 17, wherein the receiving entity is one of a communications device and a network infrastructure equipment.

Paragraph 19. A method of training a receiving entity by machine learning a model for determining communications parameters for use in dynamically generating waveform representations for transmission of portions of data by a transmitting entity to the receiving entity in a wireless communications network, the receiving entity comprising at least one of an encoder neural network, NN, and a decoder NN, the method comprising:
receiving, by the receiving entity, one or more reference signals from each of a plurality of transmitting entities, the plurality of transmitting entities being located at different geographical positions relative to the receiving entity,
estimating, by the receiving entity based on the received one or more reference signals from each of the plurality of transmitting entities, one or more channel attributes of a communications channel between the receiving entity and the each of the plurality of transmitting entities,
transmitting, by the receiving entity, an indication of the one or more estimated channel attributes for each of the plurality of transmitting entities to a remote server, and
receiving, by the receiving entity, an indication of a first NN model configuration for the at least one of the encoder NN and the decoder NN for use in determining values for one or more communications parameters, the indication of the first NN model configuration being received from the remote server and being dependent on the indicated one or more estimated channel attributes for each of the plurality of transmitting entities.

Paragraph 20. A method according to Paragraph 19, comprising
evaluating, by the remote server after training the encoder/decoder NN models with the one or more estimated channel attributes from the receiving entity, a cost function between the first NN model configuration and a second NN model configuration for the at least one of the encoder NN and the decoder NN, the second NN model configuration either having previously been transmitted by the remote server to the receiving entity or having been implemented for the at least one of the encoder NN and the decoder NN of the receiving entity at a time of manufacture of the receiving entity,
determining, based on the evaluated cost function, if the first NN model configuration is different from the second NN model configuration by more than a threshold amount of the cost function, and if so,
transmitting, to the receiving entity, an indication that the first NN model configuration is for use in replacing the second NN model configuration.

Paragraph 21. A method according to Paragraph 19 or Paragraph 20, wherein the one or more channel attributes are each one or more of:
a transfer function of the communications channel,
a Doppler shift of signals transmitted between the transmitting entity and the receiving entity over the communications channel,
a frequency offset between the transmitting entity and the receiving entity,
a timing offset between the transmitting entity and the receiving entity, and
a signal-to-interference-plus-noise, SINR, ratio between a power with which a transmitted signal is received by the receiving entity and the combination of a power of interfering signals received by the receiving entity and a power of background noise detected at the receiving entity.

Paragraph 22. A transmitting entity forming part of a wireless communications network configured to transmit data to a receiving entity via a communications channel between the transmitting entity and the receiving entity, comprising transceiver circuitry to transmit signals to and to receive signals from the receiving entity, and controller circuitry configured in combination with the transceiver circuitry to receive data for transmission to the receiving entity via the communications channel, to divide the data into portions for transmission, to receive, for each of the portions of data, an indication of channel information from the receiving entity for use by the transmitting entity in determining values for one or more communications parameters with which the portion of data should be transmitted, to determine the values for the one or more communications parameters based on the received channel information, to dynamically generate, for each of the portions of data, a waveform representative of the portion of data, the waveform representations being generated in accordance with the values of the one or more communications parameters, and to transmit each of the portions of data, using the generated waveform representations and in accordance with the values of the one or more communications parameters, to the receiving entity.

Paragraph 23. Circuitry for a transmitting entity forming part of a wireless communications network configured to transmit data to a receiving entity via a communications channel between the transmitting entity and the receiving entity, comprising transceiver circuitry to transmit signals to and to receive signals from the receiving entity, and controller circuitry configured in combination with the transceiver circuitry to receive data for transmission to the receiving entity via the communications channel, to divide the data into portions for transmission, to receive, for each of the portions of data, an indication of channel information from the receiving entity for use by the transmitting entity in determining values for one or more communications parameters with which the portion of data should be transmitted, to determine the values for the one or more communications parameters based on the received channel information, to dynamically generate, for each of the portions of data, a waveform representative of the portion of data, the waveform representations being generated in accordance with the values of the one or more communications parameters, and to transmit each of the portions of data, using the generated waveform representations and in accordance with the values of the one or more communications parameters, to the receiving entity.

Paragraph 24. A receiving entity configured to be trained by machine learning a model for determining communications parameters for use in dynamically generating waveform representations for transmission of portions of data by a transmitting entity to the receiving entity in a wireless communications network, the receiving entity comprising at least one of an encoder neural network, NN, and a decoder NN, transceiver circuitry to transmit signals to and to receive signals from the transmitting entity and to transmit signals to and to receive signals from a remote server, and controller circuitry configured in combination with the transceiver circuitry to receive one or more reference signals from each of a plurality of transmitting entities, the plurality of transmitting entities being located at different geographical positions relative to the receiving entity, to estimate, based on the received one or more reference signals from each of the plurality of transmitting entities, one or more channel attributes of a communications channel between the receiving entity and the each of the plurality of transmitting entities, to transmit an indication of the one or more estimated channel attributes for each of the plurality of transmitting entities to a remote server, and to receive an indication of a first NN model configuration for the at least one of the encoder NN and the decoder NN for use in determining values for one or more communications parameters, the indication of the first NN model configuration being received from the remote server and being dependent on the indicated one or more estimated channel attributes for each of the plurality of transmitting entities.

Paragraph 25. Circuitry for a receiving entity configured to be trained by machine learning a model for determining communications parameters for use in dynamically generating waveform representations for transmission of portions of data by a transmitting entity to the receiving entity in a wireless communications network, the receiving entity comprising at least one of an encoder neural network, NN, and a decoder NN, transceiver circuitry to transmit signals to and to receive signals from the transmitting entity and to transmit signals to and to receive signals from a remote server, and controller circuitry configured in combination with the transceiver circuitry to receive one or more reference signals from each of a plurality of transmitting entities, the plurality of transmitting entities being located at different geographical positions relative to the receiving entity, to estimate, based on the received one or more reference signals from each of the plurality of transmitting entities, one or more channel attributes of a communications channel between the receiving entity and the each of the plurality of transmitting entities, to transmit an indication of the one or more estimated channel attributes for each of the plurality of transmitting entities to a remote server, and to receive an indication of a first NN model configuration for the at least one of the encoder NN and the decoder NN for use in determining values for one or more communications parameters, the indication of the first NN model configuration being received from the remote server and being dependent on the indicated one or more estimated channel attributes for each of the plurality of transmitting entities.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 38.300 v. 15.2.0 "NR; NR and NG-RAN Overall Description; Stage 2 (Release 15)", June 2018.
[2] Holma H. and Toskala A, "LTE for UMTS OFDMA and SC-FDMA based radio access", John Wiley and Sons, 2009.

What is claimed is:

1. A method of transmitting data by a transmitting entity in a wireless communications network to a receiving entity via a communications channel between the transmitting entity and the receiving entity, the method comprising:
   receiving data for transmission to the receiving entity via the communications channel,
   receiving, from a remote server, an indication of a first NN model configuration for at least one of an encoder neural network, NN, and a decoder NN stored at the transmitting entity,
   dividing the data into portions for transmission,
   receiving, for each of the portions of data, an indication of channel information from the receiving entity for use by the transmitting entity in determining values of one or more communications parameters with which the portion of data should be transmitted,
   determining the values for the one or more communications parameters based on the received channel information,
   dynamically generating, for each of the portions of data, a waveform representative of the portion of data, the waveform representations being generated in accordance with the values of the one or more communications parameters, and
   transmitting each of the portions of data, using the generated waveform representations and in accordance with the values of the one or more communications parameters, to the receiving entity.

2. The method according to claim 1, wherein the dynamically generating, for each of the portions of data, the waveform representative of the portion of data, comprises using a model trained using machine learning.

3. The method according to claim 1, wherein
   the channel information is used to generate a vector comprising the values of the one or more communications parameters, and
   the vector is one of a plurality of predefined vectors known by both the transmitting entity and the receiving entity.

4. The method according to claim 1, wherein
   the channel information comprises a vector comprising values of one or more channel attributes of the communications channel,
   the values of the one or more channel attributes in the vector are determined by the receiving entity based on one or more reference signals transmitted by the transmitting entity to the receiving entity, and
   the waveform representations are generated in accordance with the values of the one or more communications parameters and in accordance with the received values of the one or more channel attributes.

5. The method according to claim 1, further comprising estimating the values of one or more channel attributes of the communications channel based on one or more reference signals received by the transmitting entity from the receiving entity.

6. The method according to claim 5, wherein
   the waveform representations are generated in accordance with the values of the one or more communications parameters and in accordance with the estimated values of the one or more channel attributes, and
   the method further comprises transmitting, to the receiving entity, a vector signal comprising the estimated values of the one or more channel attributes.

7. The method according to claim 5, further comprising:
   transmitting, by the transmitting entity, an indication of the one or more estimated channel attributes to a remote server,
   using, by the transmitting entity, the indication of the first NN model configuration for the at least one of the encoder NN and the decoder NN in determining values for the one or more communications parameters, the indication of the first NN model configuration being associated with the one or more estimated channel attributes.

8. The method according to claim 7, comprising
   evaluating, by the transmitting entity, a cost function between the first NN model configuration and a second NN model configuration for the at least one of the encoder NN and the decoder NN, the second NN model configuration either having previously been received by the receiving entity from the remote server or having been implemented for the at least one of the encoder NN and the decoder NN of the receiving entity at a time of manufacture of the receiving entity,
   determining, based on the evaluated cost function, if the first NN model configuration is different from the second NN model configuration by more than a threshold amount of the cost function, and if so,
   determining that the first NN model configuration should replace the second NN model configuration.

9. The method according to claim 8, further comprising determining that the first NN model configuration should replace the second NN model configuration when the transmitting entity is operating in accordance with an idle mode and/or when the transmitting entity has no data to transmit to the receiving entity.

10. The method according to claim 9, further comprising determining that the transmitting entity has no data to transmit to the receiving entity by determining that the wireless communications network has suspended scheduling of uplink and downlink signals at the transmitting entity.

11. The method according to claim 9, further comprising transmitting an indication to the receiving entity that the first NN model configuration should replace the second NN model configuration, the indication and the first NN model configuration each being transmitted using one of system information and dedicated signalling.

12. The method according to claim 9, further comprising:
broadcasting an indication, receivable by the receiving entity, that the first NN model configuration should replace the second NN model configuration, and
broadcasting, receivable by the receiving entity, the first NN model configuration.

13. The method according to claim 8, further comprising:
storing the second NN model configuration, and
deleting the second NN model configuration and storing the first NN model configuration.

14. The method according to claim 1, wherein the communications parameters comprise one or more of:
a type of waveform that should be used to represent the portion of data,
a power with which the portion of data should be transmitted,
a modulation and coding scheme that should be used for the transmission of the portion of data, and
a subcarrier spacing that should be used for the transmission of the portion of data.

15. The method according to claim 1, wherein the receiving entity comprises at least one of encoding means formed by a neural network trained using machine learning and decoding means formed by a neural network trained using machine learning.

16. The method according to claim 1, wherein the transmitting entity is one of a communications device and a network infrastructure equipment.

17. The method according to claim 1, wherein the receiving entity is one of a communications device and a network infrastructure equipment.

18. A transmitting entity forming part of a wireless communications network configured to transmit data to a receiving entity via a communications channel between the transmitting entity and the receiving entity, comprising:
transceiver circuitry to transmit signals to and to receive signals from the receiving entity, and
controller circuitry configured in combination with the transceiver circuitry:
to receive data for transmission to the receiving entity via the communications channel,
to receive, from a remote server, an indication of a first NN model configuration for at least one of an encoder neural network, NN, and a decoder NN stored at the transmitting entity
to divide the data into portions for transmission,
to receive, for each of the portions of data, an indication of channel information from the receiving entity for use by the transmitting entity in determining values of one or more communications parameters with which the portion of data should be transmitted,
to determine the values for the one or more communications parameters based on the received channel information,
to dynamically generate, for each of the portions of data, a waveform representative of the portion of data, the waveform representations being generated in accordance with the values of the one or more communications parameters, and
to transmit each of the portions of data, using the generated waveform representations and in accordance with the values of the one or more communications parameters, to the receiving entity.

19. A receiving entity configured to be trained by machine learning a model for determining communications parameters for use in dynamically generating waveform representations for transmission of portions of data by a transmitting entity to the receiving entity in a wireless communications network, the receiving entity comprising:
at least one of an encoder neural network, NN, and a decoder NN,
transceiver circuitry to transmit signals to and to receive signals from the transmitting entity and to transmit signals to and to receive signals from a remote server, and
controller circuitry configured in combination with the transceiver circuitry:
to receive one or more reference signals from each of a plurality of transmitting entities, the plurality of transmitting entities being located at different geographical positions relative to the receiving entity,
to estimate, based on the received one or more reference signals from each of the plurality of transmitting entities, one or more channel attributes of a communications channel between the receiving entity and the each of the plurality of transmitting entities,
to transmit an indication of the one or more estimated channel attributes for each of the plurality of transmitting entities to a remote server, and
to receive an indication of a first NN model configuration for the at least one of the encoder NN and the decoder NN for use in determining values for one or more communications parameters, the indication of the first NN model configuration being received from the remote server and being dependent on the indicated one or more estimated channel attributes for each of the plurality of transmitting entities.

* * * * *